(12) United States Patent  (10) Patent No.: US 9,145,185 B1
Claro  (45) Date of Patent: Sep. 29, 2015

(54) BICYCLE REAR SUSPENSION

(71) Applicant: Warphen Serioza Claro, Fullerton, CA (US)

(72) Inventor: Warphen Serioza Claro, Fullerton, CA (US)

(*) Notice: Subject to any disclaimer, the term of this patent is extended or adjusted under 35 U.S.C. 154(b) by 0 days.

(21) Appl. No.: 14/259,155

(22) Filed: Apr. 23, 2014

(51) Int. Cl.
*B62K 25/10* (2006.01)
*B62K 25/28* (2006.01)
*B62K 3/02* (2006.01)

(52) U.S. Cl.
CPC .............. *B62K 25/286* (2013.01); *B62K 3/02* (2013.01)

(58) Field of Classification Search
CPC ....... B62K 25/286; B62K 25/04; B62K 25/28
See application file for complete search history.

(56) References Cited

U.S. PATENT DOCUMENTS

| | | | |
|---|---|---|---|
| 5,452,910 A | 9/1995 | Harris | |
| 5,509,679 A | 4/1996 | Leitner | |
| 6,161,858 A | 12/2000 | Tseng | |
| 6,712,374 B2 | 3/2004 | Assier | |
| 6,969,081 B2* | 11/2005 | Whyte | 280/284 |
| 7,048,292 B2 | 5/2006 | Weagle | |
| 7,128,329 B2 | 10/2006 | Weagle | |
| 7,717,212 B2 | 5/2010 | Weagle | |
| 7,934,739 B2 | 5/2011 | Domahidy | |
| 8,033,558 B2 | 10/2011 | Earle | |
| 8,348,295 B2 | 1/2013 | Beaulieu | |
| 2004/0061305 A1 | 4/2004 | Christini | |
| 2008/0054595 A1* | 3/2008 | Lu | 280/284 |
| 2009/0102158 A1* | 4/2009 | Antonot | 280/284 |
| 2010/0102531 A1* | 4/2010 | Graney et al. | 280/284 |
| 2015/0069735 A1* | 3/2015 | Hoogendoorn et al. | 280/284 |

* cited by examiner

*Primary Examiner* — Kevin Hurley
(74) *Attorney, Agent, or Firm* — Vaheh Golestanian Nemagrdi

(57) ABSTRACT

A bicycle frame includes front and rear parts, which are pivotally connected to each other by upper and bottom links, and a shock absorber. The bicycle frame is designed so that compression in the shock absorber isolates the bicycle rider from track noise. Additionally, energy loss caused by the shock absorber compression during positive acceleration is reduced.

5 Claims, 5 Drawing Sheets

BICYCLE REAR SUSPENSION

CROSS-REFERENCE TO RELATED APPLICATIONS

Not applicable

STATEMENT REGARDING FEDERALLY SPONSORED RESEARCH OR DEVELOPMENT

Not applicable

THE NAMES OF THE PARTIES TO A JOINT RESEARCH AGREEMENT

Not applicable

INCORPORATION-BY-REFERENCE OF MATERIAL SUBMITTED ON A COMPACT DISC

Not applicable

STATEMENT REGARDING PRIOR DISCLOSURES BY THE INVENTOR OR A JOINT INVENTOR

Not applicable

BACKGROUND

This invention relates to mountain bicycles rear wheel suspension systems. A mountain bicycle may include a rear wheel suspension system to provide a smoother ride for its rider by implementing a shock absorber and a pivoting mechanism.

Shock absorbers are used to make riding over a rough terrain smoother, but they can cause loss of energy during positive acceleration. Some prior designs lack necessary features to address this problem and there is a need for a design to solve it.

SUMMARY

The present invention is directed to a bicycle frame that can be used as a mountain bike rear wheel suspension system. This invention has necessary features to reduce energy loss during positive acceleration. A bicycle frame having features of the present invention comprises a front part having a bottom bracket, a rear part, an upper link, a bottom link, and a shock absorber.

The front part and the rear part are attached to each other with the upper link, the bottom link, and the shock absorber. The upper link has a top pivot point and a bottom pivot point. The top pivot point pivotally connects the upper link to the front part and the bottom pivot point pivotally connects the upper link to the rear part. The bottom link has a front pivot point and a rear pivot point. The front pivot point pivotally connects the bottom link to the rear part and the rear pivot point pivotally connects the bottom link to the front part. The shock absorber includes a front connecting point and a rear connecting point. The front connecting point pivotally connects the shock absorber to the front part and the rear connecting point pivotally connects the shock absorber to the rear part. In the present invention the instant center of rotation of the rear part relative to the front part is located in front of the bottom bracket, and during the shock absorber change of length, which can be because of compression or extension of the shock absorber, the instant center of rotation of the rear part relative to the front part stays in front of the bottom bracket.

In certain embodiments of the present invention, the upper link and the shock absorber are pivotally connected to the rear part about a common pivot axis.

In certain embodiments of the present invention, the rear part includes two rear dropouts and a rear wheel is rotatably connected to the rear part at the rear dropouts.

In certain embodiments of the present invention, the front part has a top tube having a left end and a right end, a seat tube having a top end and a bottom end, and a down tube having a top-right end and a bottom-left end. These tubes are fixed to each other, giving a generally triangular configuration to the front part.

In certain embodiments of the present invention, during compression of the shock absorber the instant center of rotation of the rear part relative to the front part moves upwards.

BRIEF DESCRIPTION OF THE DRAWINGS

These and other features, aspects, and advantages of the present invention will become better understood with regard to the following description, appended claims, and accompanying drawings where:

DETAILED DESCRIPTION

In the following disclosure spacial direction terms such as, front, back, rear, lower, upwards, counterclockwise, and the like are used according to the shown bicycle frame, and they should be interpreted based on how the bicycle frame is drawn in the figures.

Figure 1:
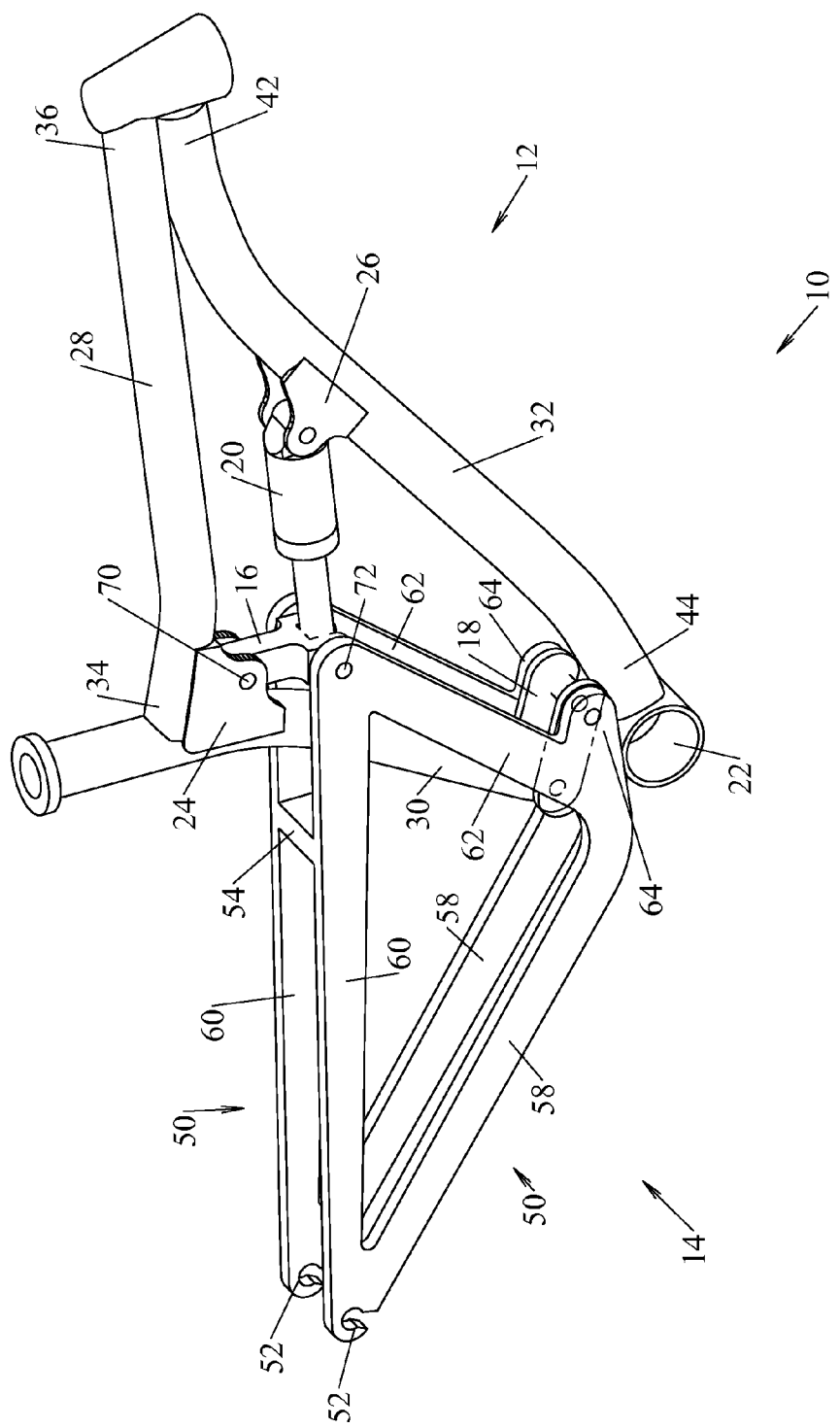
FIG. 1 is a three dimensional view of a bicycle frame in accordance with an embodiment of the present invention.
Figure 2:
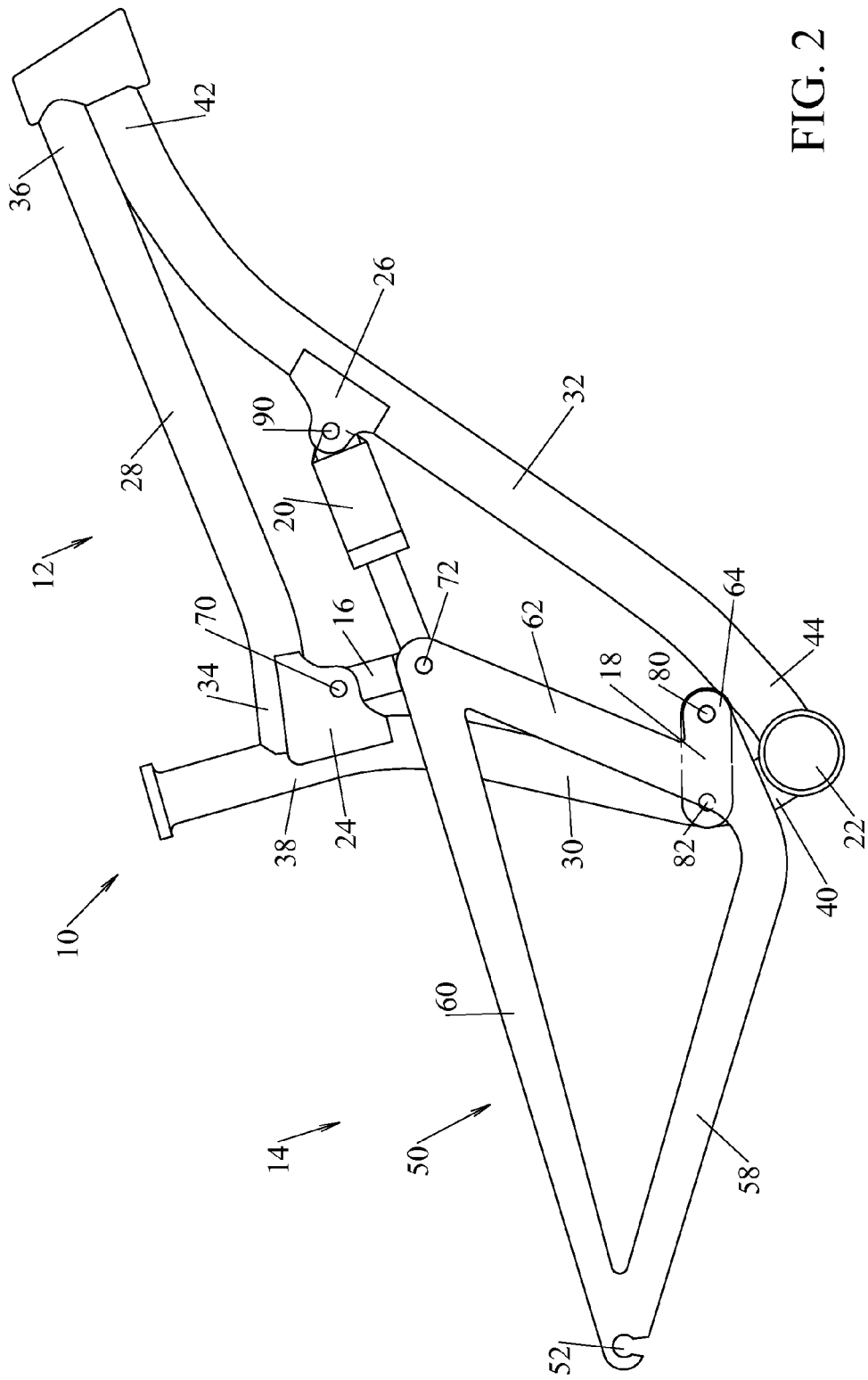
FIG. 2 is a side view of the bicycle frame of FIG. 1.

FIGS. 1 and 2 show a bicycle frame 10 according to certain embodiments of the present disclosure. The bicycle frame 10 comprises a front part 12, a rear part 14, an upper link 16, a bottom link 18, and a shock absorber 20.

In the illustrated embodiment in FIGS. 1 and 2, the front part 12 includes a bottom bracket 22, a top linkage support 24, a shock absorber connection support 26, a top tube 28, a seat tube 30, and a down tube 32. The top tube 28 has a left end 34 and a right end 36, which are located at the rear and front of the top tube 28 respectively. The seat tube 30 includes a top end 38 and a bottom end 40 (not indicated in FIG. 1), wherein the left end 34 of the top tube 28 is fixed to the top end 38 of the seat tube 30. The down tube 32 comprises a top-right end 42 and a bottom-left end 44, wherein the top-right end 42 of the down tube 32 is fixed to the right end 36 of the top tube 28, and the bottom-left end 44 of the down tube 32 is fixed to the bottom end 40 of the seat tube 30, giving a generally triangular configuration to the front part 12. The bottom bracket 22 is mounted in the connection location of the seat tube 30 and down tube 32. The top linkage support 24 is connected to the front part 12 at a corner where the top tube 28 is fixed to the seat tube 30, and the shock absorber connection support 26 is connected to the down tube 32. Both top linkage 24 and shock absorber connection 26 supports can be made from a pair of parallel plates, as illustrated in FIG. 1.

As it is shown in FIG. 1, the rear part 14 comprises of two subframes 50, two rear dropouts 52, and a connecting link 54. Each subframe 50 is mounted on either side of a median plane passing through the bicycle. The subframe 50 includes a chain stay 58, a seat stay 60, and a bracing profile 62 which are fixed to each other giving a generally triangular configuration to the subframe 50. Each bracing profile 62 close to its lower end has a protrusion 64, where the bottom link 18 is pivotally connected to the rear part 14. Ends of the connecting link 54 are fixed to the seat stays 60. The rear dropout 52 is fixed to the subframe 50 at a location where the chain stay 58 and the seat stay 60 are attached to each other, and a rear wheel (not shown here) is rotatably connected to the rear part 14 at the rear dropouts 52.

Within the scope of this disclosure, mentioned configurations of the front and rear parts 12, 14 are not exclusive. As a nonlimiting example, the front part instead of having a top tube, seat tube, and down tube fixed to each other in a triangular configuration, can be made of a single member which passes through the vertices of a triangle and three tubes that extends from the center of the triangle to its vertices.

The front part 12 is moveably attached to the rear part 14 with the upper link 16, the bottom link 18, and the shock absorber 20.

As it is shown in FIG. 2, the upper link 16 includes a top pivot point 70 and a bottom pivot point 72. The top pivot point 70 pivotally connects the upper link 16 to the top linkage support 24 of the front part 12. For its part, the bottom pivot point 72 pivotally connects the upper link 16 to the rear part 14, at or close to the location where the seat stays 60 join the bracing profiles 62. As it is illustrated in FIG. 1, the upper link 16 can be of a U-shape configuration close to the bottom pivot point 72. The top 70 and bottom 72 pivot points may or may not employ bearings and/or bushings.

As it is shown in FIG. 2, the bottom link 18 includes a front pivot point 80 and a rear pivot point 82. The front pivot point 80 pivotally connects the bottom link 18 to the protrusions 64 of the rear part 14, and the rear pivot point 82 pivotally connects the bottom link 18 to the front part 12. The front 80 and rear 82 pivot points may or may not employ bearings and/or bushings.

Figure 3:
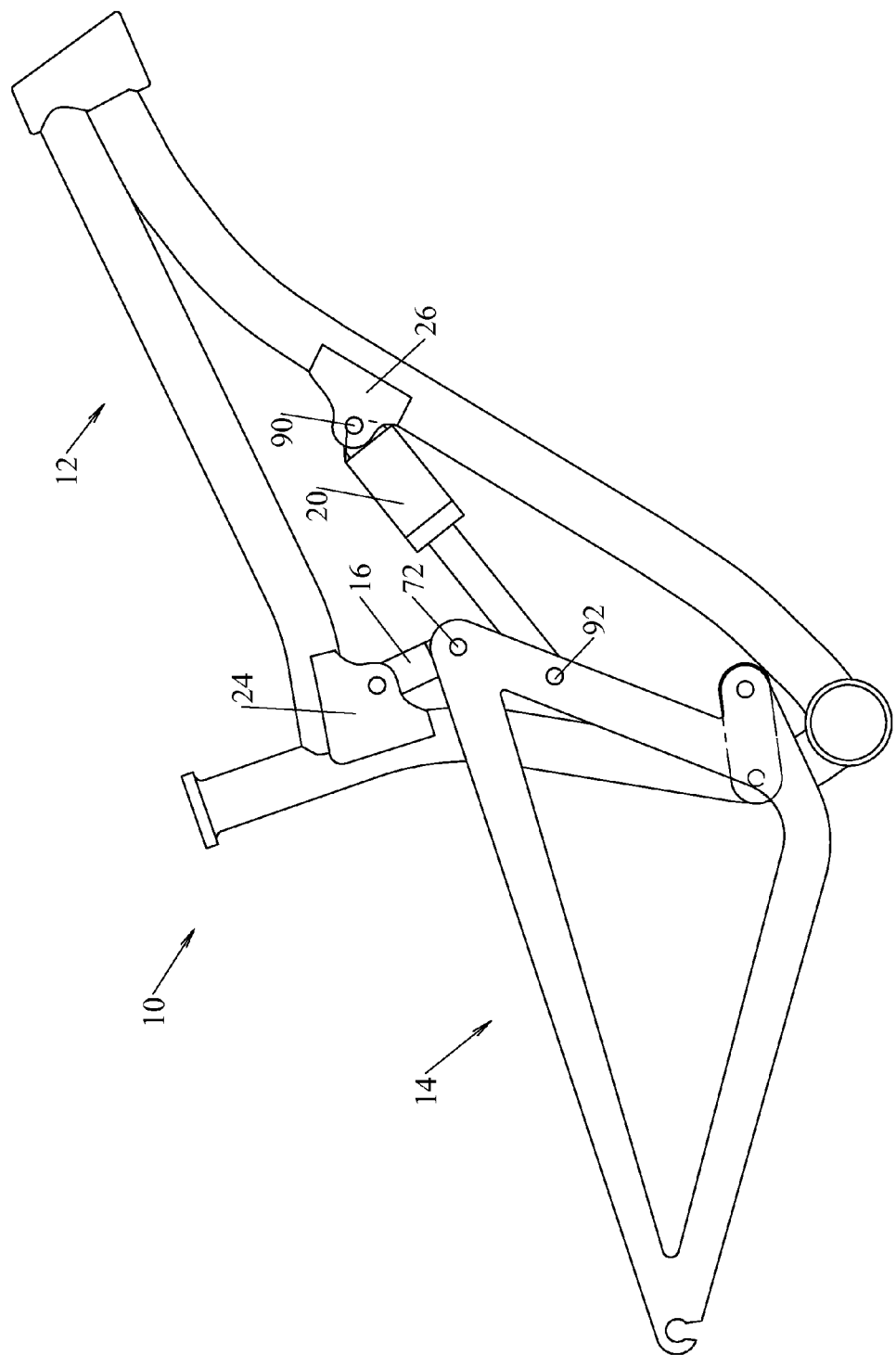
FIG. 3 is a side view of a bicycle frame in accordance with another embodiment of the present invention.

FIG. 3 shows another embodiment of the present invention, as it is shown the shock absorber 20 includes a front connecting point 90 and a rear connecting point 92. The front connecting point 90 pivotally links the shock absorber 20 to the shock absorber connection support 26 of the front part 12, and the rear connecting point 92 pivotally links the shock absorber to the rear part 14. In the preferred embodiment illustrated in FIGS. 1 and 2, the rear connecting point and the bottom pivot point have a common pivot axis, which means the same pivot shaft connects both the upper link 16 and the shock absorber 20 to the rear part 14. The front 90 and rear 92 connecting points may or may not employ bearings and/or bushings. Further description of the shock absorber 20 is not necessary because it is a well known component in the bicycle design art.

Figure 4:
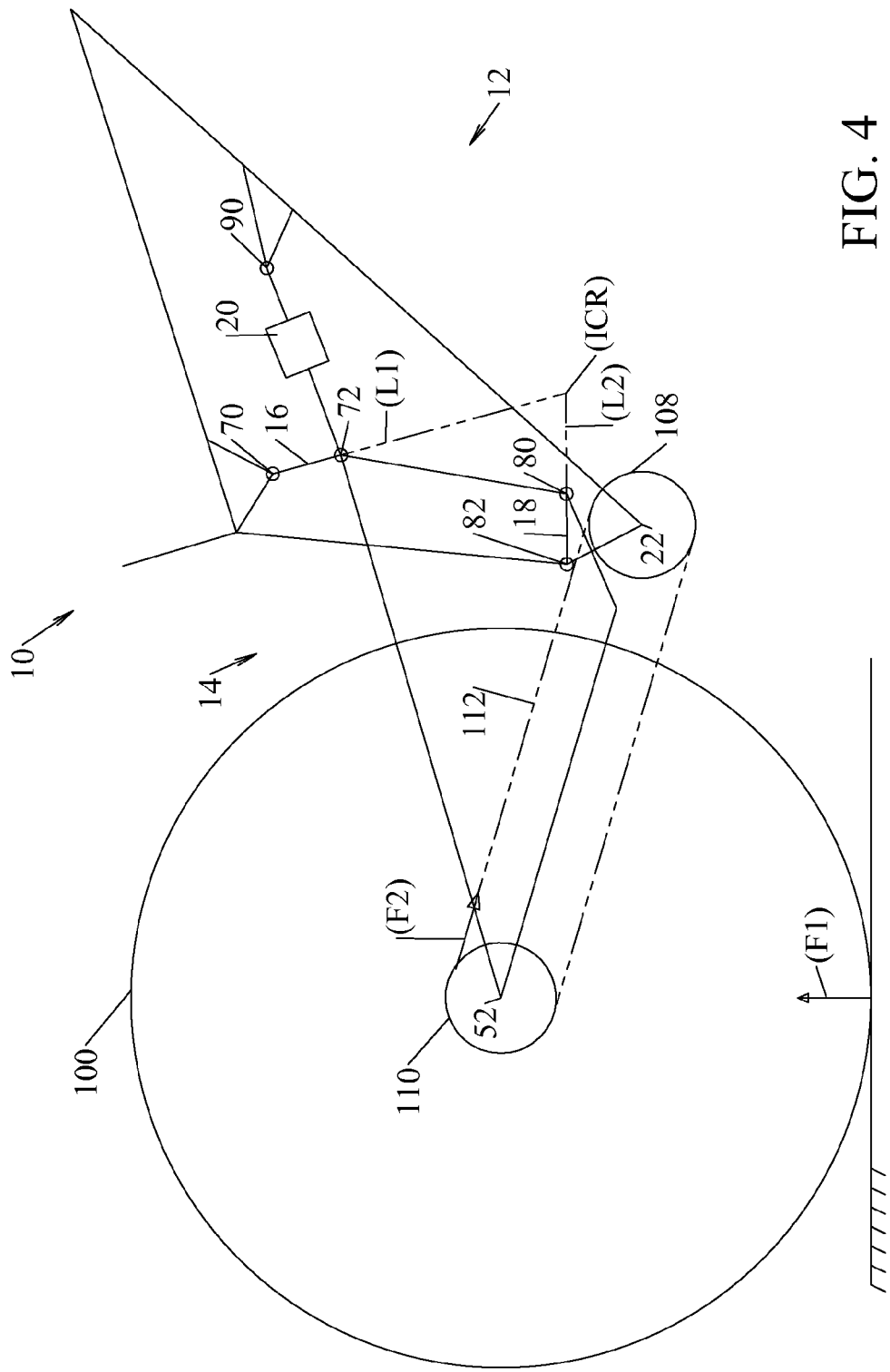
FIG. 4 is a diagrammatic side view of the bicycle frame of FIG. 2, with a shock absorber in a completely uncompressed state.

FIG. 4 shows the bicycle frame 10 of FIG. 2 via a diagrammatical side view. A rear wheel 100 is rotatably attached to the rear part 14 at the rear dropouts 52. Bicycle cranks (not shown here) and one or more chainrings 108 are rotatably connected to the bottom bracket 22, and one or more cogs 110 are fixed to the rear wheel 100 at the rear dropouts 52. A bicycle chain 112 extends from the chainrings 108 to the cogs 110, transmitting energy of pedaling to the rear wheel 100. As it is well known to the people skilled in the art of bicycle design, the instant center of rotation (ICR) of the rear part 14 relative to the front part 12 is located at the intersection of two straight lines (L1) and (L2). The line (L1) passes through the top 70 and bottom 72 pivot points, and the line (L2) passes through the front 80 and rear 82 pivot points. In the art of bicycle design there is a reasonably well known graphical method that uses the instant center of rotation (ICR) to calculate anti-squat percentage of a bicycle. The anti-squat will be described hereinafter without going into details of using the graphical method.

During positive acceleration of the bicycle, the center of gravity of the bicycle and its rider shifts towards the back of the bicycle, causing the rear wheel 100 to carry more force (F1) compared to the time when the speed is constant. This extra force (F1) tends to compress the shock absorber 20, which means extra loss of energy during positive acceleration. If the bicycle has the necessary features, it is possible to use tension force (F2) in the bicycle chain 112 to balance the extra force (F1) and reduce the loss of energy. This property of balancing is called anti-squat in the bicycle design art.

As it is shown in FIG. 4 the extra force (F1) and the chain tension (F2) create opposite momentums around the top 70 and bottom 72 pivot points, and in this way they balance each other and give anti-squat property to the bicycle frame of the present invention.

Figure 5:
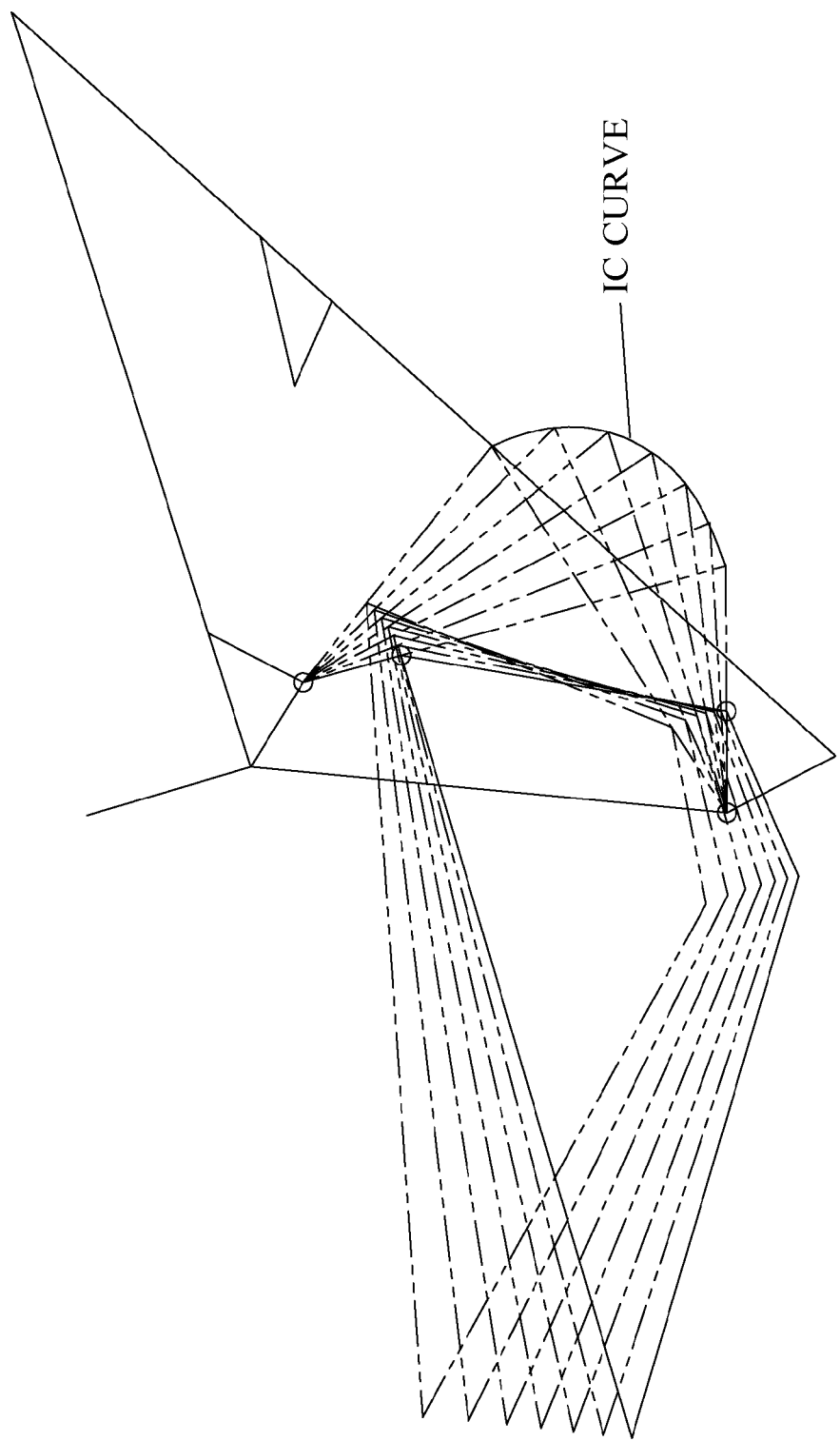
FIG. 5 is a diagrammatic side view of the bicycle frame of FIG. 2, with the shock absorber compressed from approximately 0% to 100%.

FIG. 5 shows how different elements of the bicycle frame move when the rear wheel hits a bump and shock is transferred to the rear wheel. Because of the bump, the rear dropouts move upwards, the upper and bottom links rotate counterclockwise, the shock absorber (not shown here) gets compressed and the instant center of rotation of the rear part relative to the front part moves upwards. The compression in the shock absorber acts to absorb the shock and provides a smoother ride for the rider.

Although the present description has been described in a considerable detail with reference to certain examples, it should be clear to those skilled in the art that within the scope of the present invention other embodiments are possible to be made.

What is claimed is:

1. A bicycle frame comprising:
   a front part having a bottom bracket;
   an upper link having a top pivot point and a bottom pivot point, the upper link being pivotally connected to the front part at the top pivot point;
   a bottom link having a front pivot point and a rear pivot point, the bottom link being pivotally connected to the front part at the rear pivot point;
   a rear part being pivotally connected to the upper link at the bottom pivot point, and the bottom link and the rear part are pivotally connected to each other at the front pivot point; and
   a shock absorber including a front connecting point and a rear connecting point, the shock absorber is pivotally connected to the rear part at the rear connecting point, and the front part and the shock absorber are pivotally connected to each other at the front connecting point, wherein during the shock absorber change of length, an instant center of rotation of the rear part relative to the front part stays in front of the bottom bracket.

2. The bicycle frame as defined in claim 1, wherein the upper link and the shock absorber are pivotally connected to the rear part about a common pivot axis.

3. The bicycle frame as defined in claim 1, wherein the rear part includes two rear dropouts and a rear wheel is rotatably connected to the rear part at the two rear dropouts.

4. The bicycle frame as defined in claim 1, wherein the front part further comprising:
- a top tube having a left end and a right end;
- a seat tube having a top end and a bottom end, wherein the left end of the top tube is fixed to the top end of the seat tube; and
- a down tube having a top-right end and a bottom-left end, wherein the top-right end of the down tube is fixed to the right end of the top tube, and the bottom-left end of the down tube is fixed to the bottom end of the seat tube, giving a generally triangular configuration to the front part.

5. The bicycle frame as defined in claim 1, wherein during compression of the shock absorber, the instant center of rotation of the rear part relative to the front part moves upwards.

* * * * *